Patented Mar. 22, 1949

2,465,012

UNITED STATES PATENT OFFICE 2,465,012

MANUFACTURE OF HEPTAN-3:4-DIONE AND ETHYL PROPYL ACRYLIC ACID

Bruce Duval and Alec Elce, Banstead, and Karl Heinrich Walter Tuerck, Buckles Way, Banstead, England, assignors to The Distillers Company Limited, Edinburgh, Scotland, a British company No Drawing. Application December 2, 1948, Serial No. 63,222. In Great Britain October 26, 1945

9 Claims. (Cl. 260—530)

This invention relates to the manufacture of heptan-3:4-dione and alpha ethyl beta-propyl acrylic acid by the oxidation of alpha-ethyl beta-propyl acrolein. In the oxidation of aldehydes by means of contacting the liquid aldehyde with molecular oxygen, usually the corresponding acid is obtained if under the conditions of the oxidation, the aldehyde itself or the acid are stable.

This application is a continuation-in-part of our copending application Serial No. 705,806, filed October 25, 1946, now abandoned.

We have now discovered that, when oxidizing alpha-ethyl beta-propyl acrolein in this way, a considerable amount of a diketone, heptan-3:4-dione, is formed simultaneously with the alpha-ethyl beta-propyl acrylic acid. Heptan-3:4-dione in pure form is used in perfumery essences and has hitherto been obtained, in admixture with other compounds, from oil of rue.

According to the present invention, there is provided a process for the manufacture of heptan-3:4-dione and alpha-ethyl beta-propyl acrylic acid which comprises oxidising alpha-ethyl beta-propyl acrolein in the liquid phase with molecular oxygen at a temperature below 100° C., whereby there is produced a reaction mixture containing alpha-ethyl beta-propyl acrylic acid and heptan-3:4-dione and separating the alpha-ethyl beta-propyl acrylic acid and the heptan-3:4-dione from the reaction mixture.

Heptan-3:4-dione is a strongly coloured yellow-green liquid, boiling at 148-150° C./760 mm. Hg. It can be separated from the alpha-ethyl beta-propyl acrylic acid and from unchanged alpha-ethyl beta-propyl acrolein by distillation.

The oxidation may be carried out at temperatures between 40° and 60° C.; we prefer, however, a temperature of 50° to 55° C., as at this temperature the rate of oxygen absorption is sufficiently high, whilst undesirable side-reactions do not occur to any considerable extent. The usual oxidation catalysts can be used, but as they do not have any considerable effect upon the rate of oxidation, we prefer to carry out the oxidation without the use of substantial amounts of catalysts.

The rate of oxidation slows down considerably before all the alpha-ethyl beta-propyl acrolein in the reaction mixture has been oxidised and it is a special feature of our invention to interrupt the oxidation when not more than 80% by weight of the aldehyde has been oxidised, and subsequently to separate the unchanged aldehyde and the other lower boiling constituents in the reaction mixture from the alpha-ethyl beta-propyl acrylic acid by fractional distillation. This applies not only to batch processes but also where the oxidation is carried out in a continuous manner, i. e. where alpha-ethyl beta-propyl acrolein is continuously fed to the oxidiser, and an amount of the reaction product is continuously withdrawn from the oxidiser so as to maintain the aldehyde content in the product above 20% by weight thereof.

Alpha-ethyl beta-propyl acrolein is produced by condensation of butyraldehyde in the presence of dilute alkali at temperatures above 50° C. The crude alpha-ethyl beta-propyl acrolein, as it is obtained after the uncondensed butyraldehyde and the water have been distilled off, is a dark yellow liquid, containing up to 15% by weight of high-boiling products. We have found that such a crude alpha-ethyl beta-propyl acrolein yields, on oxidation, a product containing a considerable amount of non-acidic material which cannot be separated from the alpha-ethyl beta-propyl acrylic acid by distillation. Therefore, we prefer to use as starting material the aldehyde fraction having a boiling point range of 172° to 175° C. at atmospheric pressure which has been obtained by careful fractionation of crude alpha-ethyl beta-propyl acrolein. By carrying out the fractionation in the absence of oxygen, this fraction can be obtained water-clear and, once being colourless, we have found it to remain so on storage.

The following examples illustrate the manner in which the invention may be carried into effect:

Example 1

In an oxidising vessel, alpha-ethyl beta-propyl acrolein (B. P. 172° C. to 175° C.) was brought into intimate contact with molecular oxygen under atmospheric pressure at 50° C. After 1½ hours 84.5% of the oxygen theoretically required for the complete oxidation of the alpha-ethyl beta-propyl acrolein to alpha-ethyl beta-propyl acrylic acid had been adsorbed by the reaction mixture, at which time 80% by weight of the aldehyde had reacted, and the reaction was stopped. The reaction mixture was frictionated in two stages; in the first stage, under atmospheric pressure, after some fore-runnings had been discarded, a fraction boiling between 135° and 150° C. at atmospheric pressure was isolated. The second stage of the fractionation was effected in vacuo, and unchanged alpha-ethyl beta-propyl acrolein was collected as a fraction boiling at 90° to 105° C./50 mm. and finally the alpha-ethyl beta-propyl acrylic acid fraction distilled over at 142° C. at 13 mm. Hg.

In order to purify the heptan-3:4-dione fraction, namely the fraction boiling between 135° and 150° C., this fraction was washed with sodium carbonate to remove any free acid, and was heated with sodium meta-bisulphite solution, in which the diketone dissolved instantaneously, whereas alpha-ethyl beta-propyl acrolein remained undissolved. The diketone was set free from its solution in the meta-bisulphite solution by addition of aqueous formaldehyde. The oily layer was washed and redistilled, yielding pure heptan-3:4-dione B. P. 148° C./760 mm. Hg. 85% by weight of the reacted alpha-ethyl beta-propyl acrolein was converted to the alpha-ethyl beta-propyl acrylic acid and 10% by weight was converted to heptan-3:4-dione.

The free alpha-ethyl beta-propyl acrylic acid is, on heating with acetic anhydride, converted to its anhydride (B. P. 203° to 205° C./33 mm. Hg) from which, with aniline, the anilide (M. P. 87° C.) has been prepared. The ethyl ester of alpha-ethyl beta-propyl acrylic acid was prepared by heating the acid with ethanol under reflux in the presence of 0.5% by weight sulphuric acid. It boils at 200° C./760 mm. Hg. The sodium salt of the alpha-ethyl beta-propyl acrylic acid crystallises from water, with 2 mols. of water of crystallisation, in the form of small plates, and it is easily soluble in acetone or alcohol, but is insoluble in benzene; the copper salt is soluble in most organic solvents, including benzene, but is insoluble in water.

The intense yellow colour of the diketone imparts itself to all the other low-boiling fractions of the oxidation product, e. g. to any low-boiling diluent, such as acetic acid, if present. From these materials the colour can be removed by any reagent which is known to react with the diketone, e. g. hydrogen peroxide, sulphide or sulphur dioxide, etc. The traces of diketone can, as set forth in copending United States application Serial Number 705,234, now Patent No. 2,455,241, be easily removed by exposing the distilled fractions to the action of actinic light and to contact with oxygen or an oxygen-containing atmosphere till the colour has disappeared, provided that the fractions have been freed from unsaturated materials.

*Example 2*

Alpha-ethyl beta-propyl acrolein was brought into intimate contact with molecular oxygen under atmospheric pressure at 40% C. The oxidation was stopped when 10% of the oxygen theoretically required for the complete oxidation of the alpha-ethyl beta-propyl acrolein to alpha-ethyl beta-propyl acrylic acid had been adsorbed by the reaction mixture. The reaction product was fractionated in two stages, as described in Example 1, the unchanged alpha-ethyl beta-propyl acrolein and the alpha-ethyl beta-propyl acrylic acid being collected in separate fractions.

The heptan-3:4-dione was isolated from the alpha-ethyl beta-propyl acrolein fraction as described above, and it was found that of the alpha-ethyl beta-propyl acrolein, which had been supplied to the reaction 92% was recovered unoxidised, 6.5% had been converted to alpha-ethyl beta-propyl acrylic acid and about 1% had been converted to heptan-3:4-dione.

*Example 3*

Alpha-ethyl beta-propyl acrolein was oxidised in the liquid phase by means of molecular oxygen with stirring and under atmospheric pressure at 50° C. When 25% of the xoygen which was theoretically required for the complete oxidation of the alpha-ethyl beta-propyl acrolein to alpha-ethyl beta-propyl acrylic acid had been adsorbed, the oxidation was stopped. The reaction product was worked up as described in Example 1 and it was found that of the alpha-ethyl beta-propyl acrolein used 77% was recovered unchanged, 19.7% had been converted to alpha-ethyl beta-propyl acrylic acid and about 1.6% had been converted to heptan-3:4-dione.

*Example 4*

The process for the oxidation of alpha-ethyl beta-propyl acrolein described in Example 3, was repeated, the oxidation being carried out at 70° C. and continued until 50% of the oxygen theoretically required for the complete oxidation of the alpha-ethyl beta-propyl acrolein to alpha-ethyl beta-propyl acrlic acid had been adsorbed by the reaction mixture. The oxidation product was worked up as described in the previous example and it was found that of the alpha-ethyl beta-propyl acrolein used 63.5% was recovered unreacted, 31.5% was converted to alpha-ethyl beta-propyl acrylic acid, and 3.1% to heptan-3:4-dione.

*Example 5*

In an oxidising vessel alpha-ethyl beta-propyl acrolein was brought into intimate contact with molecular oxygen at atmospheric pressure and at 100° C. The oxidation continued until the absorption of oxygen by the reaction mixture had ceased, by which time 139% of the oxygen theoretically required for the complete oxidation of the alpha-ethyl beta-propyl acrolein to alpha-ethyl beta-propyl acrylic acid had been absorbed. It was observed that towards the end of the oxidation, water and carbon dioxide were being formed. The oxidation product was distilled as described in Example 1 and it was found that of the alpha-ethyl beta-propyl acrolein used 16.8% remained unoxidised, 60.5% had been converted to alpha-ethyl beta-propyl acrylic acid and 13.4% to heptan-3:4-dione. 9.3% of the alpha-ethyl beta-propyl acrolein had been converted to oxidation by-products such as water and carbon dioxide.

In the oxidation of alpha-ethyl beta-propyl acrolein, the oxidation occurs mainly at the aldehyde group of the alpha-ethyl beta-propyl acrolein with the production of alpha-ethyl beta-propyl acrylic acid. However, a further oxidation reaction takes place whereby some of the formed alpha-ethyl beta-propyl acrylic acid is oxidised to heptan-3:4-dione. In the examples above, the expression "the amount of oxygen theoretically required for the complete oxidation of the alpha-ethyl beta-propyl acrolein to alpha-ethyl beta-propyl acrylic acid" indicates the amount of oxygen required assuming that no reactions other than the production of alpha-ethyl beta-propyl acrylic acid take place, i. e. corresponds to half a mole of oxygen per mole of alpha-ethyl beta-propyl acrolein.

It is clear that where, for example, 50% of the oxygen theoretically required has been adsorbed by the reaction mixture, due to the utilisation of part of the oxygen in the side reaction producing heptan-3:4-dione, less than 50% of the starting material will actually have been oxidised.

The oxidation is preferably stopped at the time that 80% of the aldehyde has reacted since at about that point, under the oxidation conditions employed according to the present invention the maximum amount of alpha-ethyl beta-propyl acrylic acid is obtainable.

We claim:

1. A process for the manufacture of heptan-3:4-dione and alpha-ethyl beta-propyl acrylic acid, which comprises oxidising alpha-ethyl beta-propyl acrolein in the liquid phase with molecular oxygen at a temperature from about 40° C. to 100° C. to produce a reaction mixture containing alpha-ethyl beta-propyl acrylic acid and heptan-3:4-dione and separating the alpha-ethyl beta-propyl acrylic acid and heptan-3:4-dione from the reaction mixture.

2. A process for the manufacture of heptan-3:4-dione and alpha-ethyl beta-propyl acrylic acid which comprises oxidising alpha-ethyl beta-propyl acrolein in the liquid phase with molecular oxygen at a temperature below 100° C. to produce a reaction mixture containing alpha-ethyl beta-propyl acrylic acid and heptan-3:4-dione and recovering the heptan-3:4-dione from the reaction mixture by distillation.

3. A process for the manufacture of heptan-3:4-dione and alpha-ethyl beta-propyl acrylic acid which comprises oxidising alpha-ethyl beta-propyl acrolein in the liquid phase with molecular oxygen at a temperature of 50 to 55° C. to produce a reaction mixture containing alpha-ethyl beta-propyl acrylic acid and heptan-3:4-dione and separating the alpha-ethyl beta-propyl acrylic acid and the heptan-3:4-dione from the reaction mixture.

4. A process for the manufacture of heptan-3:4-dione and alpha-ethyl beta-propyl acrylic acid which comprises oxidising alpha-ethyl beta-propyl acrolein in the liquid phase with molecular oxygen at a temperature from about 40° C. to about 100° C. until about 80% by weight of the aldehyde has been oxidised, to produce a reaction mixture containing alpha-ethyl beta-propyl acrylic acid and heptan-3:4-dione and separating the alpha-ethyl beta-propyl acrylic acid and the heptan-3:4-dione from the reaction mixture.

5. A process for the manufacture of heptan-3:4-dione and alpha-ethyl beta-propyl acrylic acid, which comprises oxidising alpha-ethyl beta-propyl acrolein in the liquid phase with molecular oxygen at a temperature from about 40° C. to about 100° C. until about 80% by weight of the aldehyde has been oxidised to produce a reaction mixture containing not less than about 20% by weight of unchanged aldehyde, alpha-ethyl beta-propyl acrylic acid and heptan-3:4-dione and separating the alpha-ethyl beta-propyl acrylic acid and the heptan-3:4-dione from the reaction mixture.

6. A continuous process for the manufacture of heptan-3:4-dione and alpha-ethyl beta-propyl acrylic acid which comprises continuously feeding alpha-ethyl beta-propyl acrolein to a reactor, oxidising the alpha-ethyl beta-propyl acrolein in the liquid phase with molecular oxygen at a temperature below 100° C. and withdrawing the reaction mixture containing unchanged aldehyde and alpha-ethyl beta-propyl acrylic acid and heptan-3:4-dione from the reactor at a rate such that the unchanged aldehyde in the withdrawn reaction mixture is maintained at an amount of at least about 20% by weight thereof, the balance of the reaction mixture being substantially composed of said alpha-ethyl beta-propyl acrylic acid and heptan-3:4-dione.

7. A continuous process as in claim 6 wherein the oxidation is carried out at a temperature of 40° C. to 60° C.

8. A process for the manufacture of heptan-3:4-dione and alpha-ethyl beta-propyl acrylic acid which comprises oxidising alpha-ethyl beta-propyl acrolein in the liquid phase with molecular oxygen at a temperature from about 40° C. to about 100° C. to produce a reaction mixture containing alpha-ethyl beta-propyl acrylic acid and heptan-3:4-dione and recovering the heptan-3:4-dione from the reaction mixture by distillation under asmospheric pressure and the alpha-ethyl beta-propyl acrylic acid by distillation under reduced pressure.

9. A process for the manufacture of heptan-3:4-dione and alpha-ethyl beta-propyl acrylic acid which comprises oxidising alpha-ethyl beta-propyl acrolein in the liquid phase with molecular oxygen at a temperature from about 40° C. to about 100° C. until about 80% by weight of the aldehyde has been oxidised, to produce a reaction mixture containing alpha-ethyl beta-propyl acrylic acid and heptan-3:4-dione and recovering the heptan-3:4-dione from the reaction mixture by distillation under atmospheric pressure and the alpha-ethyl beta-propyl acrylic acid by continuing the distillation under reduced pressure.

BRUCE DUVAL.
ALEC ELCE.
KARL HEINRICH WALTER TUERCK.

REFERENCES CITED

The following references are of record in the file of this patent:

UNITED STATES PATENTS

| Number | Name | Date |
|---|---|---|
| 1,911,219 | Bauer et al. | May 30, 1933 |
| 2,212,900 | Groll et al. | Aug. 7, 1940 |
| 2,255,421 | Groll et al. | Sept. 9, 1941 |
| 2,353,157 | Hull | July 11, 1944 |